United States Patent [19]

Coccia

[11] 4,290,587

[45] Sep. 22, 1981

[54] ORE TREATING APPARATUS

[75] Inventor: Larry A. Coccia, Elizabeth, Pa.

[73] Assignee: Pullman Incorporated, Chicago, Ill.

[21] Appl. No.: 81,711

[22] Filed: Oct. 4, 1979

[51] Int. Cl.³ ............................................. F27B 1/20
[52] U.S. Cl. .................................... 266/191; 266/195
[58] Field of Search ............... 75/34, 35, 91; 266/144, 266/156, 159, 168, 171, 191, 195

[56] References Cited

U.S. PATENT DOCUMENTS

| | | | |
|---|---|---|---|
| 2,670,946 | 3/1954 | Royster | 266/156 |
| 2,870,003 | 1/1959 | Cavanagh | 75/34 |
| 3,467,368 | 9/1969 | Celada et al. | 266/195 |
| 3,836,131 | 9/1974 | Beggs | 266/156 |

Primary Examiner—M. J. Andrews
Attorney, Agent, or Firm—Paul A. Kerstein

[57] ABSTRACT

An apparatus for the gaseous reduction of iron ore to sponge iron includes upper, intermediate and lower vessel chamber portions with the intermediate and lower chamber portions having a frusto-conical shape. An annular baffle projects from the intermediate chamber into the lower chamber and provides a configuration for cooling without the requirement of an internal coil type water cooling system.

20 Claims, 3 Drawing Figures

ORE TREATING APPARATUS

1. FIELD OF THE INVENTION

Broadly, the invention relates to apparatus for reducing metal oxides. More specifically it relates to a reactor vessel for the gaseous reduction of iron ore to sponge iron a process which is described in the Mader, et al U.S. Pat. No., 3,136,624, patented June 9, 1964.

2. DESCRIPTION OF THE PRIOR ART

A patent illustrative of the prior art is Calada, et al U.S. Pat. No. 3,467,368, Sept. 16, 1969. In this patent the interior configuration of the reactor vessel requires and discloses water cooling coils for cooling sections of the furnace. In the configuration of the present invention both the intermediate chambers and lower chambers have the frusto-conical shape with the lower chamber including the annular baffle and the upper annular wall with the baffle providing the annular gas pocket which discharges the gases outwardly and upwardly thus obviating the necessity of cooling coils.

U.S. Pat. No. 3,836,131 is pertinent to show a reactor having a configurated gas distributor within a converging bin through which a bed of solid gas particles descend. However, the present invention is an improvement which is not suggested by this reference and is of an entirely different configuration in the cooling arrangement.

SUMMARY OF THE INVENTION

The reactor or reduction vessel of the present invention comprises an upper hemispherically formed chamber which provides for the entrance of a hot gas and cooling gas, as well as the ore which is to be reduced to sponge iron. An intermediate chamber is of a truncated or frusto-conical inverted shape with the outside casing and inner lining shaped to provide a narrower throat portion at the lower end thereof. The vessel further includes a lower chamber portion also of frusto-conical inverted configuration having outer walls which are connected to the narrow throat portion by means of an annular wall sloping diagonally from the horizontal and being connected to the narrow throat portion.

An annular baffle or shield is connected to the narrow throat portion to provide a shield projecting into the lower chamber and with the annular upper diagonal wall forming an annular gas pocket which communicates with outlet openings in said annular wall. The arrangement obviates the need for water cooling.

DESCRIPTION OF THE PREFERRED EMBODIMENT

Figure 1:
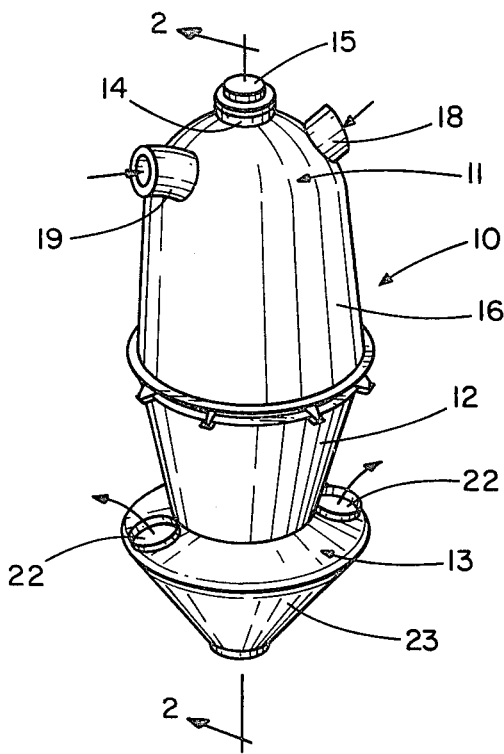
FIG. 1 is a perspective view of an improved reactor apparatus.
Figure 2:
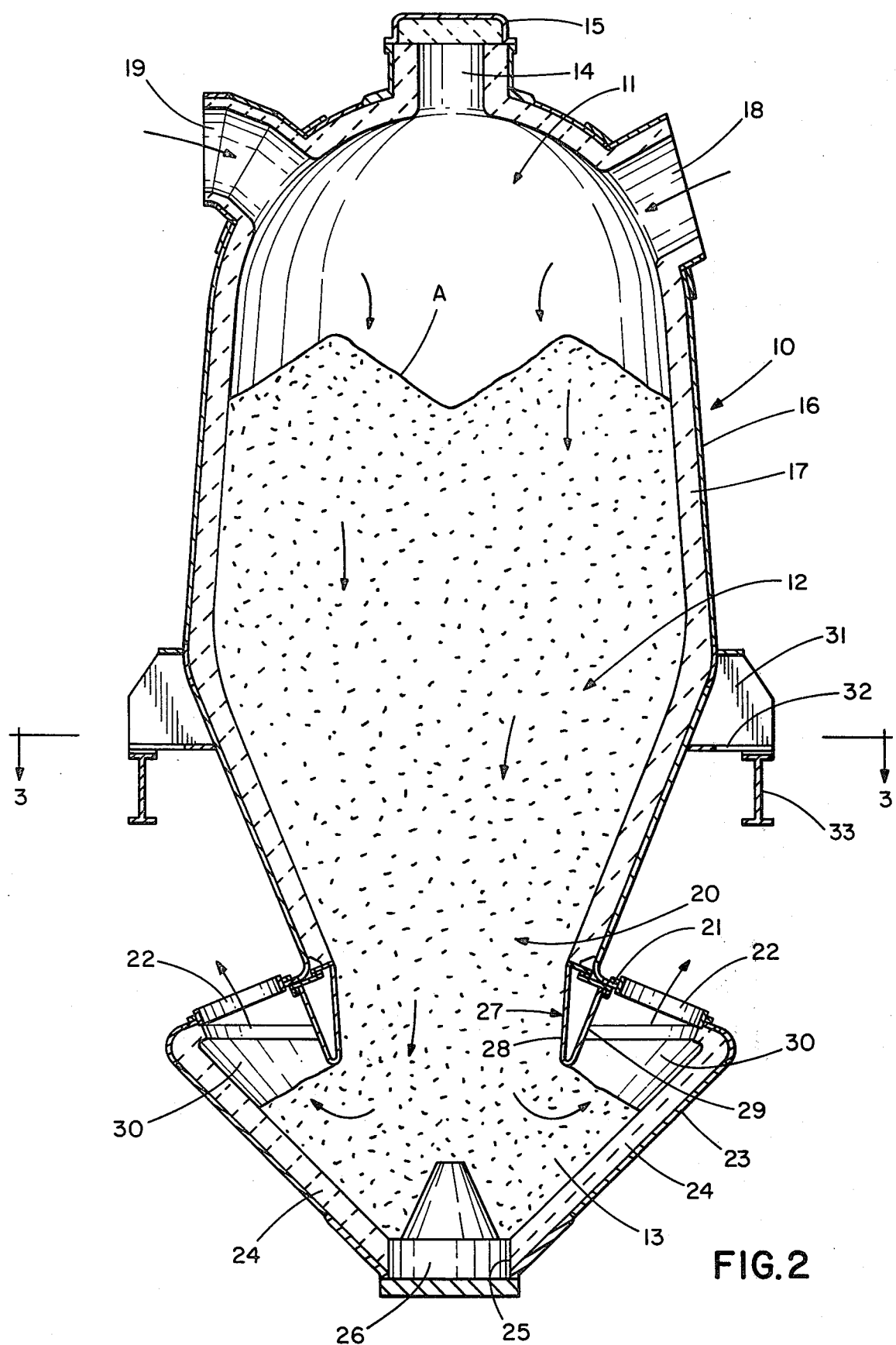
FIG. 2 is a cross-sectional view taken along the line 2—2 of FIG. 1.

As best shown in FIGS. 1 and 2 an apparatus for the reduction of iron oxides includes a reducing vessel 10 comprising an upper chamber 11, an intermediate chamber 12 and a lower chamber 13. The upper chamber 11 is of a hemispheric shape including a charging opening 14 adapted to be closed by a closure cap 15 through which the metal ore is supplied for gaseous reduction of sponge iron, a method of which is described in the above first mentioned U.S. Pat. No. 3,467,368. The vessel 10 is formed of an outer metal shell or casing 16 and has connected interiorly thereto a refractory or ceramic lining 17, conventional in the art. The upper chamber includes a hot gas inlet connection 18 and a reducing cooling gas inlet 19. The charge provided is designated at A.

The intermediate chamber 12 is formed in an inverted truncated or frusto-conical manner and at its lower portion is provided with a narrow throat portion 20. The upper ceramic wall lining 17 terminates at this point and the outer metal casing wall is integral or connected to an outwardly and downwardly sloping wall 21 of annular shape. The wall 21 includes one or more outlets 22 which are facing upwardly and outwardly. The lower chamber is also frusto-conical or of truncated inverted shape and includes the outer casing wall portion 23 and lower ceramic casing wall 24. A discharge opening 25 is closed by a lower closure member 26. An annular shield or baffle 27 includes a vertical wall 28 forming an extension of the throat portion 20. The vertical wall 28 is connected to a diagonal wall 29, both of said walls being annular and being connected in V-shaped configuration. The wall 29 is substantially perpendicular to the annular wall 21. The baffle 27 provides for an annular cooling space or pocket 30 which discharges the gas outwardly and upwardly through the outlets 22.

Figure 3:
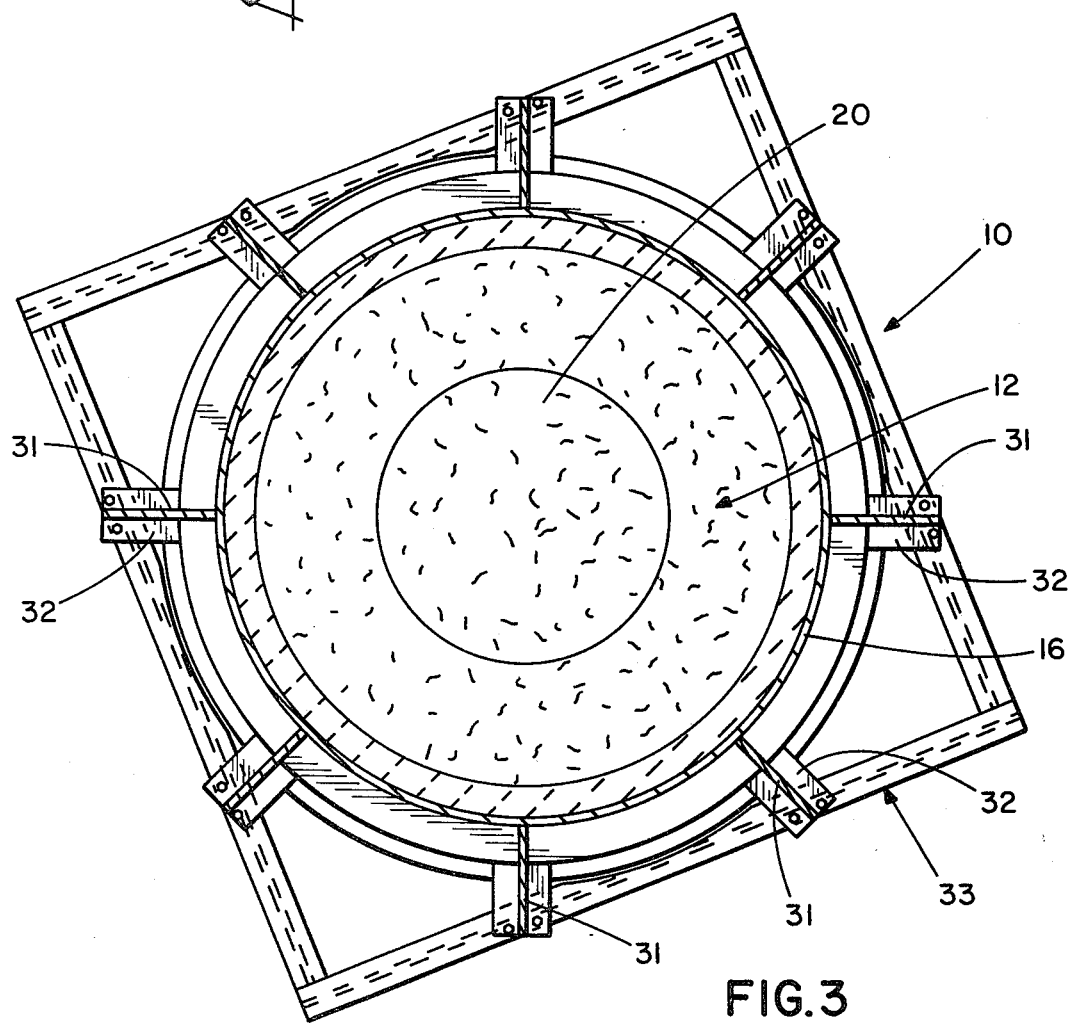
FIG. 3, is a cross-sectional view taken along the line 3—3 of FIG. 2.

As best shown in FIG. 3, the vessel 10 has connected thereto outwardly projecting brackets 31 and flanges 32 which are supported and bolted on support 33 consisting of I-beams.

The configuration of the vessel is such that the effect of the cooling gases supplied to the lower chamber through the narrow throat provide for effective cooling of the area and the annular cooling pocket which is formed enhances the cooling function with the gases efficiently being discharged through the discharge outlets. The shape of the reactor, and the novel baffle arrangement allows sufficient transfer in the critical area of the reactor so that the addition of cooling pipes are not required.

What is claimed is:

1. In an apparatus for the gaseous reduction of metal oxide ore including a vessel having an outer wall defining an upper cylindrical chamber portion
an intermediate chamber portion; and
a lower chamber portion
said upper chamber portion including a charging opening, a reduction gas inlet means and a hot gas inlet means,
said intermediate chamber portion being formed by a first frusto-conical portion of said cylindrical outer wall and having at its lower end a relatively narrower throat portion,
said lower chamber portion including a second frusto-conical wall portion at its upper end being of a greater diameter in cross-section than said upper chamber portion, and an upper wall being of frusto-conical shape, converging upwardly, inwardly and being connected to the upper portion of said second frusto-conical cylindrical wall portion and being connected to said narrower throat portion thereby enhancing cooling of said metal oxide ore by reducing gas independent of water cooling, a plurality of gas outlets provided in said connecting upper wall to direct gas from said reactor outwardly of said vessel, and said second frusto-conical cylindrical wall portion having at its lower end a relatively narrow discharge portion.

2. The invention in accordance with claim 1, said first frusto-conical wall portion including a baffle projecting downwardly into said lower chamber.

3. The invention in accordance with claim 2, said baffle providing an annular gas pocket in said lower chamber communicating with said gas outlets.

4. The invention in accordance with claim 2, said baffle comprising an annular shield forming an extension of said first frusto-conical wall.

5. The invention in accordance with claim 4, said annular shield being of a V-shaped configuration.

6. The invention in accordance with claim 4, said annular shield having a cross-sectional inner diameter dimension substantially equal to the inner diameter dimension of said narrow cylindrical portion.

7. The invention in accordance with claim 6, said annular shield having its upward end portion connected to the narrow cylindrical portion and including an outer wall perpendicular to said upper connecting wall, and an inner wall connected to said outer wall.

8. The invention in accordance with claim 7, said inner and outer walls of said annular shield being of V-shaped configuration.

9. The invention in accordance with claim 1, said gas outlets being positioned to direct gases upwardly from said lower chamber.

10. The invention in accordance with claim 1, said lower chamber including an annular baffle extending from said narrow cylindrical portion, and said baffle providing an annular gas pocket below said gas outlets.

11. The invention in accordance with claim 1, said lower portion being of substantially lesser volume than the combined volumes of said upper and intermediate portions.

12. The invention in accordance with claim 2, said baffle extending below the upper end section of said second frusto-conical wall portion forming an annular gas pocket thereby further enhancing effective cooling.

13. The invention in accordance with claim 1, said reduction gas inlet and hot gas inlet being disposed on opposed sides of the upper portion.

14. A process for reduction of the iron ore to its metalic iron state comprising the steps of:

charging the vessel with the iron ore, introducing a hot gas in the upper portion of the reactor vessel in two separate stages and allowing it in each stage to traverse downwardly the extend of the reactor vessel and out a plurality of gas outlets in the connecting upper wall connecting the lower and intermediate portions of the reactor, discontinuing the introduction of the hot gas into the reactor vessel, introducing a reducing cooler gas into the upper portion of the reactor vessel and allowing the gas to stream through the charge cooling the charge and reducing the iron oxide to iron, the gas traversing downwardly the length of the reactor vessel and out through a plurality of gas outlets in the connecting upper wall connecting the lower and intermediate portions of the reactor, and discharging the metalic iron from the reactor vessel.

15. The invention in accordance with claim 14, said hot gas in its first stage comprising partially spent hydrogen rich gas.

16. The invention in accordance with claim 14, said hot gas in its second stage comprising carbon monoxide and hydrogen.

17. The invention in accordance with claim 14, and said cooling reducing gas comprising carbon monoxide and hydrogen.

18. The invention in accordance with claim 14, said intermediate portion of the reactor being of frusto-conical shape having at its lower end a relatively narrower portion.

19. The invention in accordance with claim 18, said lower portion of the reactor being of frusto-conical shape and having the extent of its upper end exceeding the width of the narrower portion.

20. The invention in accordance with claim 19, said upper wall being of frusto-conical shape, converging upwardly and inwardly connecting the upper end of the lower portion to the narrower portion.

* * * * *